(12) United States Patent
Carlson

(10) Patent No.: US 7,288,905 B2
(45) Date of Patent: Oct. 30, 2007

(54) INTEGRATED CIRCUIT AND METHOD FOR TRAINABLE CONTROL AND OPERATION OF DC MOTOR

(76) Inventor: Andrew Evert Carlson, 2376 Woolsey St., Apt. B, Berkeley, CA (US) 94705

( * ) Notice: Subject to any disclaimer, the term of this patent is extended or adjusted under 35 U.S.C. 154(b) by 318 days.

(21) Appl. No.: 10/906,629

(22) Filed: Feb. 28, 2005

(65) Prior Publication Data

US 2005/0196156 A1    Sep. 8, 2005

Related U.S. Application Data

(60) Provisional application No. 60/550,201, filed on Mar. 5, 2004.

(51) Int. Cl.
*H02P 3/08* (2006.01)
(52) U.S. Cl. .................. 318/254; 318/439; 318/138; 318/811; 318/599; 388/907.5; 388/811; 388/800
(58) Field of Classification Search ............... 318/254, 318/138, 439, 811, 599; 388/800, 811, 907.5
See application file for complete search history.

(56) References Cited

U.S. PATENT DOCUMENTS

| 4,792,737 A | * | 12/1988 | Goff et al. | 318/615 |
| 5,672,945 A | * | 9/1997 | Krause | 318/434 |
| 6,392,372 B1 | * | 5/2002 | Mays, II | 318/254 |
| 6,611,117 B1 | * | 8/2003 | Hardt | 318/254 |
| 2003/0011332 A1 | * | 1/2003 | Mays, II | 318/254 |
| 2005/0023999 A1 | * | 2/2005 | Denen et al. | 318/6 |

* cited by examiner

*Primary Examiner*—Rina Duda

(57) ABSTRACT

A method and device for control of a low-cost DC motor such as that suitable for portable or battery-powered applications are disclosed such that an intended behavior for the motor may be programmed without reliance on external equipment or specific expertise. The invention enables programming of a motor controlling device by means of physical manipulation of the motor. In other words, the invention allows for the training of a motor by demonstrating the intended behavior for the motor. The invention specifies a method of parsing an observation of the motor system into storable commands, while preserving information on motor response and conditions for execution. A motor controller device comprising an implementation of this method is also presented.

14 Claims, 2 Drawing Sheets

INTEGRATED CIRCUIT AND METHOD FOR TRAINABLE CONTROL AND OPERATION OF DC MOTOR

CROSS-REFERENCE

This application is based upon and claims priority of U.S. Provisional Application Ser. No. 60/550,201 filed Mar. 5, 2004, incorporated by reference.

BACKGROUND OF THE INVENTION

This invention relates to a device and method for control of a direct-current (DC) motor, and more particularly, to control that allows for training a motor-actuated machine as a means of programming.

Small DC motors are used in a variety of low-cost, battery-powered applications, comprising toy cars, mechanical dolls, and hard drives. In such applications, control of the motor is achieved by a motor controller, which is often programmed once during assembly for the lifetime of the motor. A motor controller drives a DC motor by controlling the electrical current that passes through the pins and windings of the motor. Packaged units comprising a motor and motor controller are called smart motors for their ability to be programmed and reprogrammed electronically. Smart motors are used in industrial and academic robotics applications, among others; however, they are too large, powerful, and expensive to be feasible in applications that require low cost of manufacture or portability.

A motor controller physically comprises one or several integrated circuits, of which circuits or subcircuits can be grouped by function. All motor controllers must comprise a control circuit that generates an electrical waveform to drive the motor. If the motor controller employs a digital Complementary Metal-Oxide-Semiconductor (CMOS) architecture, which uses currents typically on the order of tens of microamps, it may further comprise a drive circuit to amplify the drive current to a level of milliamps or more. A motor controller may further comprise an observational apparatus that measures the rotational velocity of the motor and electrically communicates this measurement to the control circuit. With such an addition, closed loop control of the motor is possible, which allows for performance robustness against variability in motor loading or the power supply. The motor controller may accept electronically programmed input commands to be executed immediately or to be stored as part of a program.

Before this invention, motor controllers were programmed electronically, either with a computer, microcontroller, or waveform generator. The programming of the motor controller is therefore reliant on additional equipment and user expertise that are not otherwise required for said low-cost applications. Motor controller commands comprise a desired velocity, position, or torque setting; some may further comprise a velocity, position, or torque condition at which to stop execution of the command; however, the command must be programmed into the motor controller before operation. Motor controllers are therefore programmed, and often designed, for a particular application.

A generally known method for recording the motion of a motor is to sample velocity, position, or torque and to record this data in memory. In this method, the behavior of a motor is reproducible only under conditions identical to those at the time of the recording. To reproduce a behavior conditional on the state of any external sensory or command inputs, it is necessary to store all of the relevant information to that behavior. As an illustrative specific example, consider a motor intended to rotate an arm until a collision has occurred, as signaled by a collision sensor on the arm, and then rotate back. By recording only the said motor state variables at each sampling time, the motor controller would fail to reproduce this behavior if the point of collision or the starting point changes, because it does not record the external state information of the collision sensor.

SUMMARY OF THE INVENTION

Accordingly, it is an objective of this invention to provide a device and method for parsing and storing information describing an observed behavior of a motor and external conditions, which may be demonstrated in the field as a means of programming without requirement of additional equipment or electronics expertise, for reproducing the behavior with a fair degree of accuracy.

This invention provides a device for control of a DC motor comprising a circuit to allow training as a means of programming the motor. An observational circuit generates an electrical signal containing information on the state of the motor, comprising velocity and position, and external state information, which may comprise sensor data, commands from other systems, interrupt signals, and other relevant inputs on which the behavior of the motor depends. The signal is a discrete, digital signal of several bits and is generated at frequent samplings of the state of the motor. The training circuit parses this signal into sequential, independent commands according to the information contained in the signal. In the preferred embodiment, each command comprises a motor state variable function (preferably representing motor velocity), the external state information, and a duration for the execution of the command. This structure has the advantage of including conditional information for each command. The control circuit stores commands from the training circuit for later execution. In the execution, the control circuit generates an electrical waveform to drive the motor according to the motor state variable function of the currently executing command, adjusting the waveform as necessary based on the information in the observational signal. The control circuit is designed such that if the external state information changes or if the interval of execution exceeds the specified duration of the command, execution of the current command ceases, and the next command is executed. With its training and execution functionality, this device has the advantage of allowing programming without requiring explicit user input of commands. A motor controller with this device would have the advantage of requiring no additional equipment or expertise for programming.

In one embodiment of this invention, the circuits are all designed into the same CMOS integrated circuit. This integration has the advantages of low mass production cost, small size, and cheap repackaging with the motor.

This invention provides a method for parsing an observational signal containing information on the state of a motor and an external state into a set of commands. A finite set of possible functions is maintained to describe one specific variable of the motor state, which may be motor position, velocity, torque, or another state variable. In the preferred embodiment, these functions describe motor velocity. One function from this set is selected such that it best matches the observed motor state variable over the time interval beginning at the end of the previous command and continuing to the current time. A confidence figure indicating the strength of the match is generated. If the observed motor state variable deviates from the chosen function beyond a threshold determined in part by the confidence, and remains beyond the threshold for at least one sampling, the current command is stored in memory. The process repeats for the next command until the training period has ended. One advantage of this system is its robustness to noise. If a change in the external state accompanies a change in the observed motor state, the original external state is assumed to be a condition of execution for the command and stored accordingly. This method has the advantages of allowing conditions to be incorporated in the commands and of requiring no external specification by the programmer of the execution interval of a command.

Other features and advantages of this invention will become apparent through the detail and figures of the description below.

DETAILED DESCRIPTION

Figure 1:
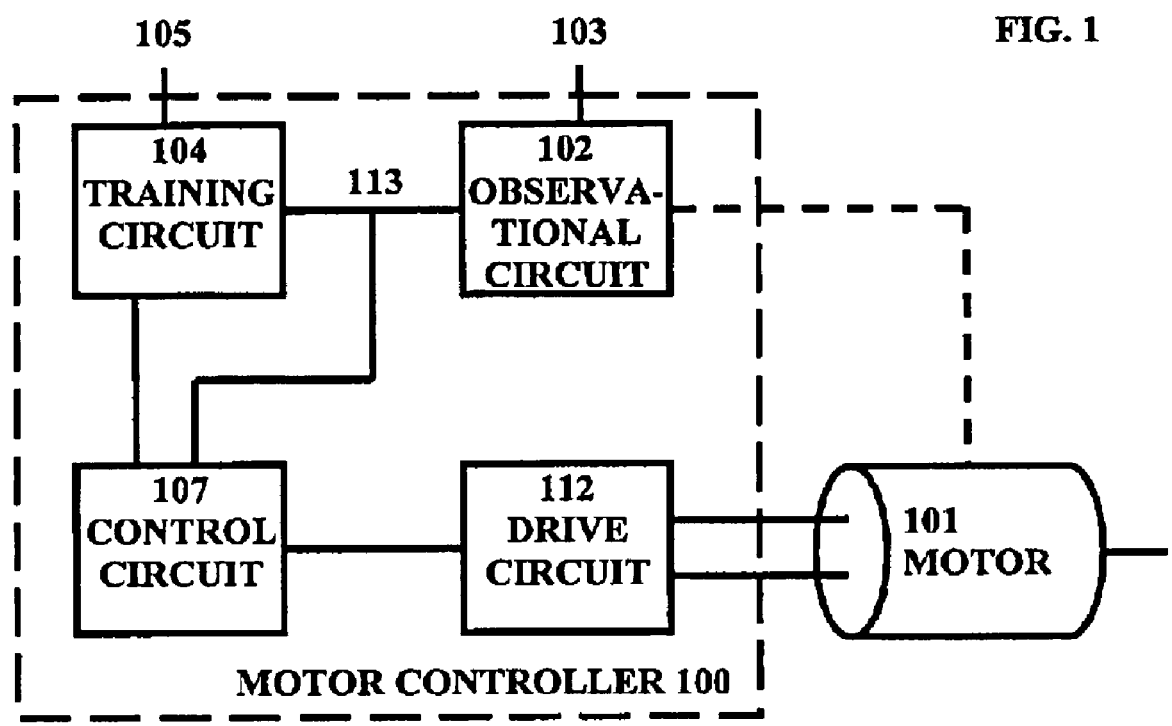
FIG. 1 shows a block diagram of one embodiment of the device of this invention, with each of the major subcircuits and input and output connections identified.

The preferred embodiment of the invention is described here in detail. FIG. 1 shows a motor controller 100 connected to a low-cost DC motor 101.

Observational circuit 102 generates a digital observational signal 113 of a multitude of bits comprising information on the state of the motor 101 and external state connection 103. The external state connection 103 can comprise a multitude of bits. In one embodiment, external state connection 103 connects to a switch that outputs a digital signal indicating when it is depressed. For example, if the invention were used in a toy car, external state connection 103 could connect to the bumper of the car to signal a collision. In an alternate embodiment, external state connection 103 is connected to at least one microcontroller or at least one additional motor controller 100 to coordinate action between a plurality of motors 101.

There are many generally known methods of observing the state of a DC motor. In one embodiment, a tachometer or a wire touching the commutator of a motor generates an electric waveform with frequency inversely proportional to the angular velocity of the motor. From this signal, motor velocity can be observed by measuring the frequency of the waveform, and motor position can be determined by counting the number of periods. In an alternate embodiment, the velocity of the motor 101 is observed by measuring the magnetic field, and position is determined by integrating velocity with respect to time. The variables of the state of the motor that the observational circuit 102 samples may comprise velocity, position, or torque, or a combination of these.

Training circuit 104 parses the observational signal 113 into a sequence of independent commands that can be stored in memory 106. Training circuit 104 operates according to a user-generated training signal 105. In one embodiment, training signal 105 is a one bit active high digital signal activating training circuit 104. While training circuit 104 is activated, the output of control circuit 107 is a weak or zero-value signal, which does not drive the motor 101, which is directly or indirectly manipulated by the user to train the motor controller 100.

The method to parse an observational signal such as observational signal 113 goes as follows. A motor state variable function is selected from a set of predetermined functions to represent a motor state variable described by observational signal 113 over the time interval beginning either at the end of the last command or at the activation of training circuit 104 if this is the first command, and continuing to the current time. The set of predetermined motor state variable functions is chosen such that the time integral of each command over an interval between two samplings is unique among the set of functions. In one embodiment of the invention, this condition is achieved by maintaining a set of motor state variable functions that are scalar multiples of a unit function. The selected motor state variable function can then be uniquely represented in a command by its scalar multiple of the unit function. This embodiment has the advantage of simple implementation that uses a small number of bits. The observed motor state variable is subtracted from the expected value of said variable according to the selected motor state variable function. The absolute value of the difference is compared against a threshold by means of a comparator circuit. The threshold is determined by a function of inputs which comprise the number of observations in the duration of the command. If all other inputs are held constant, the threshold is a monotonically decreasing function of this number. The selection of motor state variable function and subsequent comparisons are repeated according to the above until one of the following conditions is met:

The absolute value of the differences between the observed and expected motor state variables exceeds the threshold, for some predetermined, finite number of observations, or The absolute value of the difference between the current observed and expected motor state variables exceeds the threshold and the signal on the external state connection 103 changes.

If the signal on the external state connection 103 changes but the absolute value of the difference between the current observed and expected motor state variables does not exceed the threshold, said conditions are not met. For the particular example of the toy car mentioned previously, these conditions differentiate between possible behaviors of executing a new command when the toy car runs into a block and executing the current command, pushing the blocks out of the way.

If one of said conditions is met, a command comprising the selected motor state variable function, the external state information, and a duration for execution is stored in memory. The duration comprises a multiple bit digital signal that may represent either time or angular position. In the preferred embodiment, the motor state variable is velocity, and the duration comprises the position of motor 101 or an arbitrary maximum value if said condition was met because of a change of the signal on the external state connection 103. The training method then repeats from the beginning while training circuit 104 is activated and there is room to store additional commands in memory 106.

It will become apparent to persons skilled in the art that this method can be extended to parse a multitude of signals that are not otherwise related to motor control, but the behavior of which can be similarly represented by dependencies on external information or duration.

In one embodiment of the invention, a circuit implementation of a Kalman Filter (see Kalman, "A New Approach to Linear Filtering and Prediction Problems," Transactions of the ASME-Journal of Basic Engineering, 1960 p35) is used to generate the function that best fits the motor velocity from observational signal 113. In said embodiment, the threshold function is determined according to the variance equations of the Kalman Filter.

Figure 2:
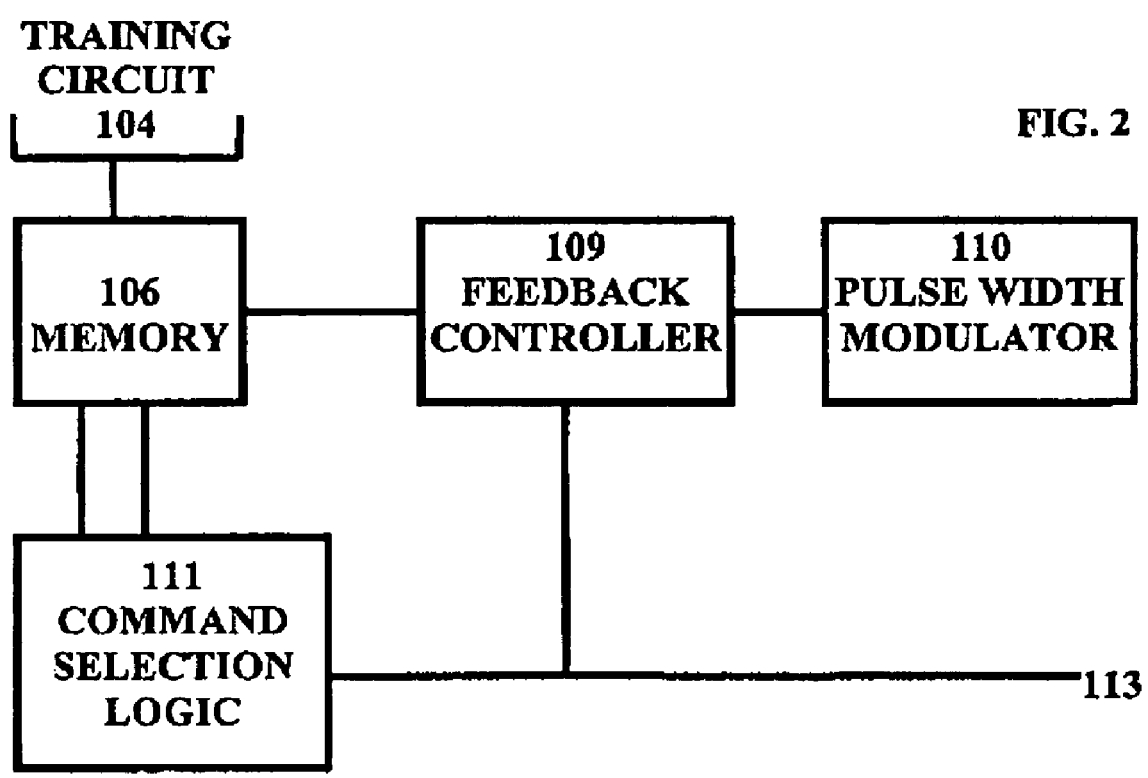
FIG. 2 shows a block diagram of the preferred embodiment of control circuit 107 to facilitate explanation of how the invention controls a DC motor.

Control circuit 107 is shown in detail in FIG. 2. The memory 106 stores the sequential commands of the current program, and it can be written to by the training circuit 104. In one embodiment, the memory 106 can also be directly programmed electronically from outside the motor controller 100. The nature of memory 106 may be non-volatile, such as flash memory, or random-access, such as DRAM or SRAM memories, or of another form. Each command in memory comprises a representation of the motor state variable function that control circuit 107 will drive motor 101 to reproduce, expected external state information to be compared against the external state information in observational signal 113, and a duration of execution for the command. In the preferred embodiment, the motor state variable is velocity, and the representation of the velocity function is a digital signal of a multitude of bits indicating the magnitude of a predetermined unit velocity function. The motor state variable function with magnitude according to the executing command is an input to the feedback controller 109, which also accepts the motor state variable in observational signal 113 as an input. In one embodiment, feedback controller 109 is a proportional-integral-derivative (often called PID) controller. The output of feedback controller 109 is a digital signal comprising a multitude of bits representing the amount of current to drive motor 101, independently of variations in power supply and motor loading. In the preferred embodiment, pulse width modulator 110 converts said output into a pulse train with duty cycle proportional to the digital value of the output signal. The pulse train is the output of control circuit 107 and the input to drive circuit 112.

Control circuit 107 further comprises command selection logic 111 to compare information from observational signal 113 comprising either angular position or time, and external state information, against duration and external state information stored in the current command in memory 106. The external state information from observational circuit 102 and from memory 106 are input into a predetermined conditional logic function that indicates whether the current command should be executed. In one embodiment, this function is logical XOR to indicate any difference in the information. The command selection logic 111 advances the memory 106 to the next command according to the output of said function and according to whether the duration of the command has been exceeded, as determined by a comparator circuit.

Drive circuit 112 amplifies the power of the output waveform of control circuit 107 for delivery to the motor 101. Drive circuit 112 comprises one power amplifier for each pin of motor 101 and directional logic. According to the direction of rotation specified in the motor state variable of the current command, the directional logic determines which power amplifier is connected to the output waveform of control circuit 107. The input of the other power amplifier is connected to ground. There are many known ways of amplifying power. In the preferred embodiment, a break-before-make inverter design and a buffer chain are used. Drive circuit 112 may further comprise devices for electrical protection of the integrated transistors, such as electrostatic discharge capacitors, Zener diodes, and diffusion moats for substrate isolation.

Although this invention has been described with reference to specific embodiments, the invention is not limited to the particular embodiments disclosed here. Variations and uses not explicitly disclosed here will be apparent to persons skilled in the art, and this invention should be given the broadest possible interpretation.

What is claimed is:

1. A DC motor controller, comprising: a control circuit capable of executing commands by specifying the amount of electric current supplied to a motor, a drive circuit capable of supplying electric current directly to a motor, an observational apparatus capable of generating a time-varying electronic signal representing the state of a motor, and a training circuit capable of parsing said signal into a sequence of commands that can be stored in memory and if executed in an identical environment would reproduce with reasonable accuracy said state of the motor, whereby said signal incorporates information on motor velocity, motor position, and an external state that is not directly set by the controller.

2. The controller of claim 1, wherein each command comprises: an identification of one of a multitude of preexisting control functions; a condition for determining whether the control function should be executed, based on external state information which may change due to user input, the environment, or another cause or as an indirect result of the operation of the motor controller; and the duration, measured either in time or in the angular rotation of the motor, for which the control function should be executed as long as said condition would otherwise allow execution.

3. The controller of claim 2, wherein during training a circuit implementation of a Kalman Filter selects the best command to match the observed state of a motor and generates an estimate of the confidence of that selection, which with the external state information determines the end of the current command and the beginning of a new command.

4. The controller of claim 1, wherein the control circuit uses feedback control to reproduce a behavior of the motor represented in stored commands created during training, in a manner robust to variations or differences with respect to the time of training in motor loading or power supply.

5. The controller of claim 1, wherein the velocity of the motor is represented by any monotonic, linear or non-linear function derived from measurements at discrete times by relating change in angular rotation to elapsed time.

6. The controller of claim 1, wherein all of the circuits, including the control circuit, drive circuit, observational circuit, and training circuit, are integrated onto a single CMOS chip.

7. A method of parsing a time-varying signal into a sequence of commands, such that a machine executing said commands would reproduce with reasonable accuracy said time-varying signal, comprising: the selection from a finite set of possible commands the one that would reproduce with the best accuracy the signal from the end of the last command to the current time; an estimation of the confidence that the selected command is the best description; when the signal deviates from the expected value of that command beyond a threshold dependent on the confidence, the determination of the end of that command and the storage of that command in memory; and the repetition of this process to generate subsequent commands.

8. The method of claim 7, wherein each possible command comprises a scalar multiple of a predetermined unit function that describes a motor state variable with respect to time, and the best command is determined by selecting the multiple that would reproduce with the best accuracy the observational data.

9. A method of parsing a time-varying signal into sequential segments, whereby the ordered juxtaposition of said segments provides a reasonable reproduction of said time-varying signal, comprising: the selection from a finite library of predetermined functions the one that best describes the signal from the end of the last segment to the current time; a set of conditions to determine the end of a segment, based on the difference of the signal and the expectation of the selected function and external state information; the formation of a segment comprising the selected functions and the state information necessary to evaluate said conditions; and the repetition of this method to generate subsequent segments.

10. The method of claim 9, in which the form of the segments comprises: a representation of a periodic function that for the duration of the segment provides a reasonable reproduction of the time-varying signal, external state information relevant to the conditions in which said reproduction is valid over the duration of the segment, and a duration for the segment.

11. The method of claim 10, in which the library of predetermined functions is a finite and discrete set of scalar multiples of a unit function, and the representation of the function is the magnitude.

12. The method of claim 9, in which said conditions depend upon a threshold, and the threshold is determined dynamically in part by an estimate of the accuracy of how the selected function represents said signal.

13. The method of claim 12, in which said threshold is determined in part also by the number of samples in the time interval of the segment, with the magnitude of the threshold occasionally and asymptotically decreasing with further sampling.

14. The method of claim 9, wherein said signal represents an observed behavior of a motor.

* * * * *